(12) United States Patent
Matsuda et al.

(10) Patent No.: US 9,324,983 B2
(45) Date of Patent: Apr. 26, 2016

(54) BATTERY MODULE FOR VEHICLE

(75) Inventors: Hiroko Matsuda, Mie (JP); Akihiro Yamada, Mie (JP); Ryoutarou Kino, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 118 days.

(21) Appl. No.: 14/353,848

(22) PCT Filed: Feb. 16, 2012

(86) PCT No.: PCT/JP2012/053674
§ 371 (c)(1),
(2), (4) Date: Apr. 24, 2014

(87) PCT Pub. No.: WO2013/061625
PCT Pub. Date: May 2, 2013

(65) Prior Publication Data
US 2014/0295216 A1   Oct. 2, 2014

(30) Foreign Application Priority Data

Oct. 25, 2011   (JP) ................................. 2011-233660

(51) Int. Cl.
*H01M 2/10* (2006.01)
*H01M 10/42* (2006.01)
*B60L 11/18* (2006.01)

(52) U.S. Cl.
CPC ......... *H01M 2/1083* (2013.01); *B60L 11/1879* (2013.01); *H01M 10/425* (2013.01); *Y02T 10/705* (2013.01); *Y02T 10/7005* (2013.01)

(58) Field of Classification Search
None
See application file for complete search history.

(56) References Cited

U.S. PATENT DOCUMENTS

2006/0030176 A1\* 2/2006 Ikeda ..................... H02G 3/088
439/76.2
2008/0314657 A1\* 12/2008 Ikeda .................... H01M 2/206
180/65.1

FOREIGN PATENT DOCUMENTS

| JP | U-4-88317 | 7/1992 |
| JP | A-2004-123046 | 4/2004 |
| JP | A-2006-158133 | 6/2006 |
| JP | A-2009-050155 | 3/2009 |
| JP | A-2010-036594 | 2/2010 |

OTHER PUBLICATIONS

May 15, 2012 International Search Report issued in PCT/JP2012/053674 (with English Translation).

\* cited by examiner

*Primary Examiner* — Gregg Cantelmo
(74) *Attorney, Agent, or Firm* — Oliff PLC

(57) ABSTRACT

An object of exemplary embodiments is to prevent increasing the height of a battery module housing a battery pack and a junction box. In the junction box, resin cases of a high-profile relay and an electric component are fixed to the shielding case wall. A low-voltage electric wire or a high-voltage electric wire is laid out on the metal plate. A resin case cover is put on when the relay and electric component is fixed to the bottom wall or the metal plate. The low-voltage electric wire or the high-voltage electric wire is covered with the case cover, predetermined contact portions of the relay and the electric component are exposed, the low-voltage electric wire or the high-voltage electric wire and a bus bar are disposed on the case cover, and the bus bar, the low-voltage electric wire or the high-voltage electric wire are connected to the exposed contact portions.

1 Claim, 4 Drawing Sheets

BATTERY MODULE FOR VEHICLE

This application claims priority to JP 2011-233660 filed Oct. 25, 2011. This application is also a national stage application of PCT/JP 2012/053674, filed Feb. 16, 2012.

Exemplary embodiments relate to a battery module for a vehicle, and particularly, a battery module in which a junction box incorporating a relay to be connected to a power source on a battery pack side is housed and disposed in a metal shielding case. The metal shielding case houses the battery pack to be mounted in an electric car or a hybrid car and reduces the height of the junction box in the battery module.

BACKGROUND

Conventionally, in an electric car or a hybrid car, as shown in FIG. 6 related to a hybrid car described in JP 2010-36594A, a high-voltage battery pack 100 is disposed on a rear side in a vehicle compartment, or the like, and the battery pack is connected to an apparatus 103 mounted in an engine room via a high-voltage power cable 101. In the apparatus 103, the battery pack is connected to a fuse 104 and a DC/DC module 105 that is disposed integrally with or in proximity to a high/low-voltage junction box.

When a relay is mounted on the junction box, generally, as shown in FIG. 7, a relay 201, which is a heat generating element, is often mounted on the upper side of an upper case 202 of a junction box 200 to suppress overheating inside the junction box 200. When the relay 201, which has a high profile, is mounted on the upper side of the junction box 200, the height H2 of the relay 201 is added to the height H1 of the junction box 200 and the total height is increased.

SUMMARY

In a hybrid car or the like disclosed in Patent Document 1, a battery pack and a junction box including a fuse connected to the battery pack and the like are disposed at different positions, that is, the battery pack is disposed on a vehicle compartment side and the junction box is disposed on an engine room side. The battery pack and the junction box are connected via a high-voltage power cable 101. If this configuration is adopted, the length of the high-voltage power cable wired is increased and the apparatus 103 connected to the high-voltage power cable 101 needs to be also housed in a metal shielding case to shield noise generated by a high-voltage electric wire in the apparatus 103, and there is the problem that the apparatus or equipment becomes large.

Therefore, recently, a battery module has been developed in which a metal case (shielding case) housing a battery pack houses a junction box as well, a shielded electric wire is connected to a load side of a branch connection circuit including a relay or fuse housed in the junction box, and the shielded electric wire is guided to the outside from the shielding case.

However, if a junction box whose height is increased with a relay mounted thereon, as shown in FIG. 7, is housed in a shielding case housing a battery pack, the height of the shielding case also needs to be increased. Therefore, the space where the battery module is installed may be limited, so that there may be the risk that the battery pack cannot be disposed at the desired position.

Moreover, if a high-voltage electric wire and a low-voltage electric wire are connected to an electric apparatus mounted on a junction box, the low-voltage electric wire receives noise generated by the high-voltage electric wire, and there is the problem that the low-voltage electric wire connected to the load side tends to generate noise.

Exemplary embodiments were made in view of the foregoing problems, and it is an object thereof that when a junction box is housed in a shielding case housing a battery pack, the height of the junction box is reduced and noise generated by a high-voltage electric wire does not affect a low-voltage electric wire connected to the junction box.

To solve the foregoing problems, an exemplary embodiment provides a battery module for a vehicle including a junction box housed inside a metal shielding case for housing a battery pack, wherein, in the junction box, resin cases of a high-profile relay and an electric component are fixed to a bottom wall of the shielding case or to a surface of a metal plate fixed to the bottom wall, and one of a low-voltage electric wire and a high-voltage electric wire is laid out on the metal plate and connected to predetermined terminal portions of the relay and the electric component, a resin case cover of the junction box is put on in a state where the relay and the electric component fixed to the bottom wall or the metal plate as well as said one of the low-voltage electric wire and the high-voltage electric wire are covered with the case cover, predetermined contact portions of the relay and the electric component are exposed through openings provided in the case cover, the other of the low-voltage electric wire and the high-voltage electric wire and a bus bar are disposed on the case cover, and the bus bar and/or the other of the low-voltage electric wire and the high-voltage electric wire are/is connected to the exposed contact portions.

As described above, the relay having a relatively high profile in electric apparatuses to be attached to the junction box is directly fixed to a bottom wall of the shielding case in which the junction box is installed or to the upper surface of a metal plate fixed to the bottom wall and the resin case cover of the junction box is put on such that the relay is covered with the case cover, so that increase in the total height of the junction box by the relay can be avoided. Moreover, one of the low-voltage electric wire and the high-voltage electric wire is disposed under the case cover and the other is disposed on the case cover to separate the low-voltage electric wire and the high-voltage electric wire by the case cover, so that noise that the low-voltage electric wire receives from the high-voltage electric wire can be reduced.

It is preferable that the low-voltage electric wire is disposed under the case cover and the high-voltage electric wire is disposed on the case cover, the contact portions of the relay and the electric component disposed under the cover case, which are connected to the low-voltage electric wire, are provided on side surfaces of the relay and electric component and are connected to the low-voltage electric wire, which passes through a through hole provided on a side wall of the case cover. The contact portions, which are connected to the high-voltage electric wire or the bus bar disposed on the case cover, are provided on upper surfaces of the relay and electric component and are connected to the bus bar or the high-voltage electric wire disposed on the case cover.

Thus, disposing the high-voltage electric wire on the case cover has the advantages of enabling the power source to be distributed on the case cover outside the case and preventing noise from affecting the devices in the case. Also, disposing the low-voltage electric wire under the case cover has the advantage that if noise is generated outside the case, a certain distance is secured with the case and no measures need to be taken against the noise.

Moreover, the case cover is fixed to the shielding case by fastening the high-voltage electric wire and the bus bar disposed on the case cover to the contact portions of the relay and the electric component disposed under the case cover.

When this configuration is adopted, it is possible to eliminate the necessity of a means for fixing the case cover of the junction box to the shielding case, so that the case cover can be made simple and work for fixing the case cover to the shielding case is not required.

As described above, in the battery module in which the junction box is housed in the shielding case for housing a battery pack, the relay and electric components having a high profile are fixed to the bottom wall of the shielding ease or to the metal plate fixed to the bottom wall, and a case of the junction box retaining the bus bar is used as the case cover with which the relay and the electric components are covered. Therefore, the total height of the junction box is not equal to the height obtained by adding the height of the relay to the height of the case of the junction box, and it is possible to avoid enlargement of the size of the junction box.

Moreover, since the high-voltage electric wire and the low-voltage electric wire are shielded by the case cover of the junction box, it is possible to suppress the noise reception of the low-voltage electric wire from the high-voltage electric wire.

DETAILED DESCRIPTION OF THE EMBODIMENTS

Hereinafter, an exemplary embodiment will be described with reference to the drawings.

FIGS. 1 to 5 show an exemplary embodiment.

Figure 1:
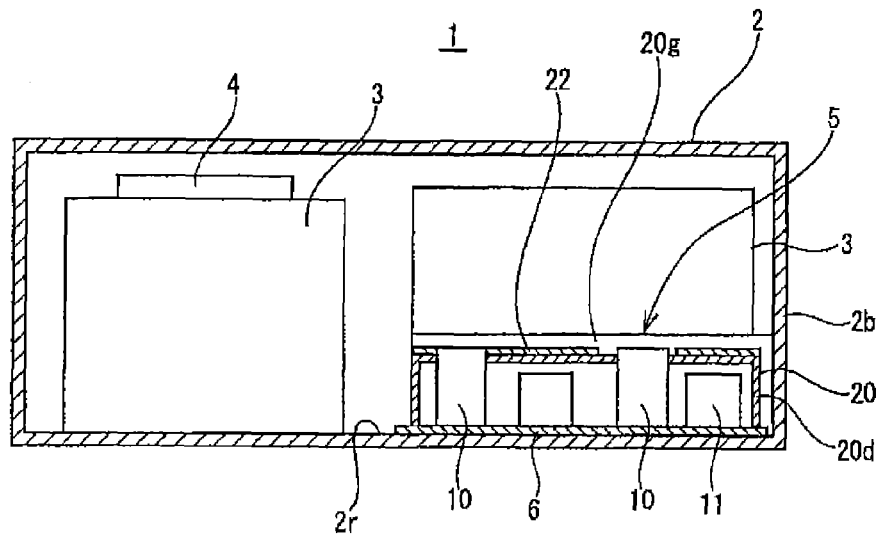
FIG. 1 is a schematic view showing a battery module of an exemplary embodiment.

FIG. 1 shows a battery module 1 to be mounted in an electric car.

In the battery module 1, battery packs 3 are housed in a shielding case 2 that is made of metal such as an aluminum alloy. A housing area X for a junction box is provided in a part surrounded by a front wall 2a and right side wall 2b of the shielding case 2 and a junction box 5 is disposed in the housing area X. ECUs 4 are mounted on the battery packs 3.

Figure 4:
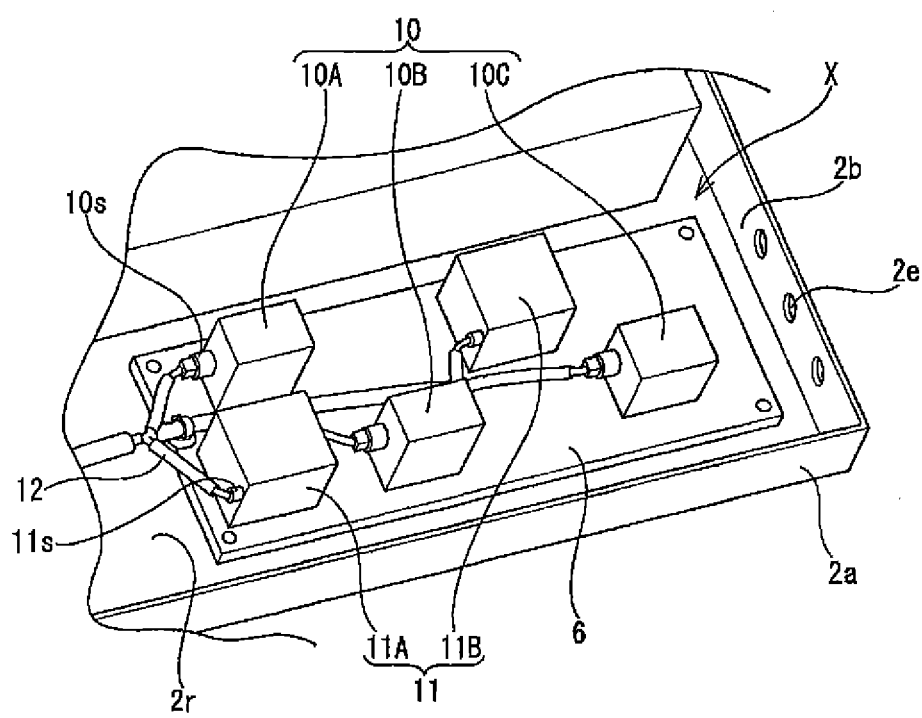
FIG. 4 is a perspective view showing a state where relays and the like are mounted in a shielding case of the battery module.

As shown in FIG. 4, a rectangular metal plate 6 is laid at the position where the junction box 5 is disposed and is fixed to a bottom wall 2r of the shielding case 2 by bolts. A plurality of relays 10 (10A, 10B and 10C) having a high profile and relays 11 (11A and 11B) for starting electric components are disposed, spaced apart from each other, on the upper side of the metal plate 6, and resin cases of the relays 10 and the electric components 11 are fixed to the metal plate 6 by bolts.

Low-voltage electric wires 12 connected to the relays 10 and electric components 11 fixed to the metal plate 6 are disposed on the metal plate 6. The high-voltage electric wire 30 is an electric wire connected to the ECUs 4 mounted on the battery packs 3.

Figure 2:
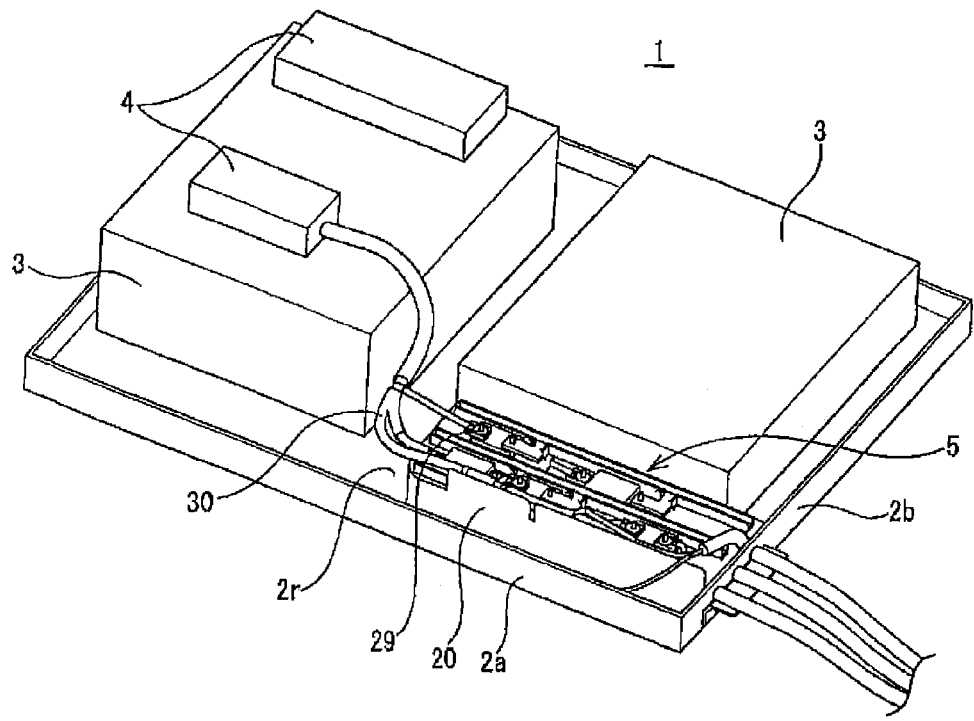
FIG. 2 is a perspective view showing a state where a lid is not put on the battery module and the battery module is not closed.
Figure 5:
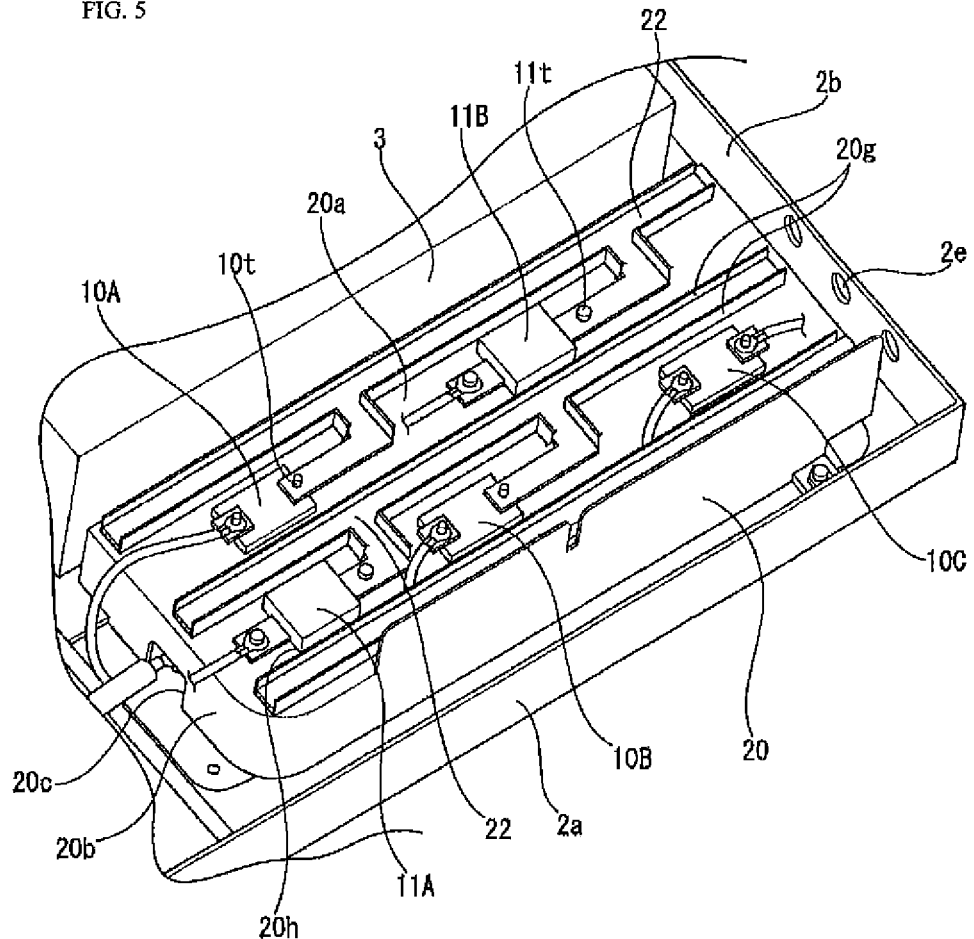
FIG. 5 is a perspective view showing a state where the relays and the like are covered with a case cover of the junction box.
Figure 6:
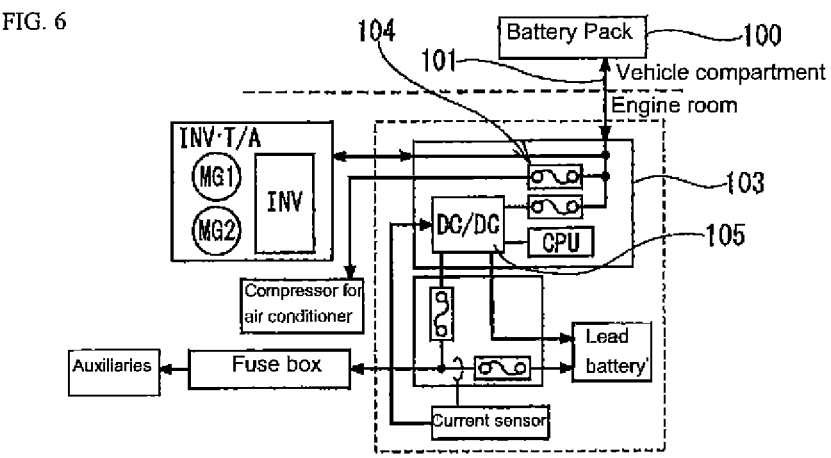
FIG. 6 is a drawing showing a conventional example.
Figure 7:
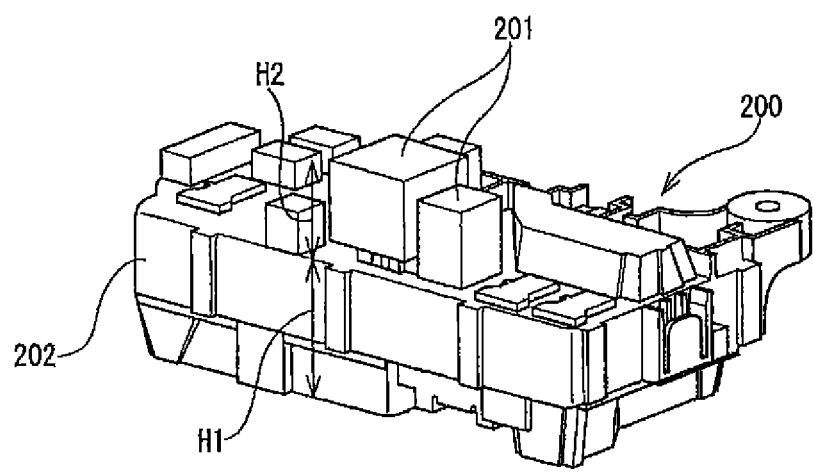
FIG. 7 is a perspective view of a conventional junction box on which relays are mounted.

As shown in FIG. 2 and FIG. 5, a resin case cover 20 is put over the plurality of the relays 10 and electric components 11, which are fixed to the metal plate 6, as well as the low-voltage electric wires 12, in a state where they are covered with the case cover 20. The case cover 20 serves as a case body of the junction box 5. In the case cover 20, a side wall 20b projects downward from the circumference of an upper wall 20a and a lower end of the side wall 20b comes into contact with positions along the contour line of the metal plate 6. Moreover, in the drawings, an opening 20c for insertion of the low-voltage electric wire is provided at the lower end of a left side wall 20b. An opposing right side wall 20d is located on the inner surface side of the right side wall of the shielding case 2, and a high-voltage shielded electric wire is inserted through a through hole 2e on the right side wall of the shielding case 2 and laid out on the upper wall 20a of the case cover 20.

Bus bars and guide walls 20g for the high-voltage electric wires project from the upper wall 20a of the case cover 20. In addition, openings 20h are provided at the positions corresponding to the respective relays 10 and electric components 11 on the upper wall 20a, and the high-voltage electric wires of the relays 10 and electric components 11 and connecting terminal portions 10t and 11t project upward through the openings 20h. On the other hand, as shown in FIG. 4, terminal portions 10s and 11s connected to the low-voltage electric wires of the relays 10 and electric components 11 project from the side surfaces of the respective cases of the relays 10 and the electric components 11 and are located under the case cover 20.

Bus bars 22 are fitted and fixed to the passages defined with the guide walls 20g, and the terminal portions 11t connected to the high-voltage electric wires of the electric components 11 are fixed by nuts through bolt holes provided in the bus bars 22. Moreover, bolting terminals 29 connected to the end of the high-voltage electric wires 30 that are disposed on the upper surface side of the case cover 20 are fitted to the terminal portions 10t of the relays 10 and are fixed by nuts.

No lid is put on the case cover 20 on which the bus bars 22 and the high-voltage electric wires 30 are disposed and the upper surface of the case cover 20 is opened. A lid 32 is put over and closes the entire shielding case 2. This configuration prevents the junction box 5 from storing heat generated by the relays 10, electric components 11, bus bars 22, and high-voltage electric wires 30 and overheating.

The battery module 1 with the above-described configuration is assembled, as shown in FIG. 4, first by mounting the relays 10 and electric components 11 on the metal plate 6 and fixing the metal plate 6 to the upper surface of the bottom wall 2r of the shielding case 2. The low-voltage electric wires 12 to be connected to the ECUs 4 on the battery packs 3 are disposed on the upper side of the metal plate 6 and are connected to the electric components 11.

Next, as shown in FIG. 2 and FIG. 5, the case cover 20 on which the bus bars 22 are disposed is installed in a state where the relays 10 and the electric components 11 are covered with the case cover 20. At that time, the case cover 20 is set such that the low-voltage electric wire 12 can be inserted through the opening 20c provided on the side wall of the case cover 20.

In this state, the relays 10 and the electric components 11 are located at the openings 20h on the upper wall 20a of the case cover 20, and the terminal portions 10t and 11t are fastened to the terminal portions of the bus bars 22 and the high-voltage electric wires 30. By this fastening, the case cover 20 is fixed to the bottom wall 2r of the shielding case 2 via the metal plate 6. Thereby, the case cover 20 need not be directly fixed to the metal plate 6 or the bottom wall 2r of the shielding case.

Figure 3:
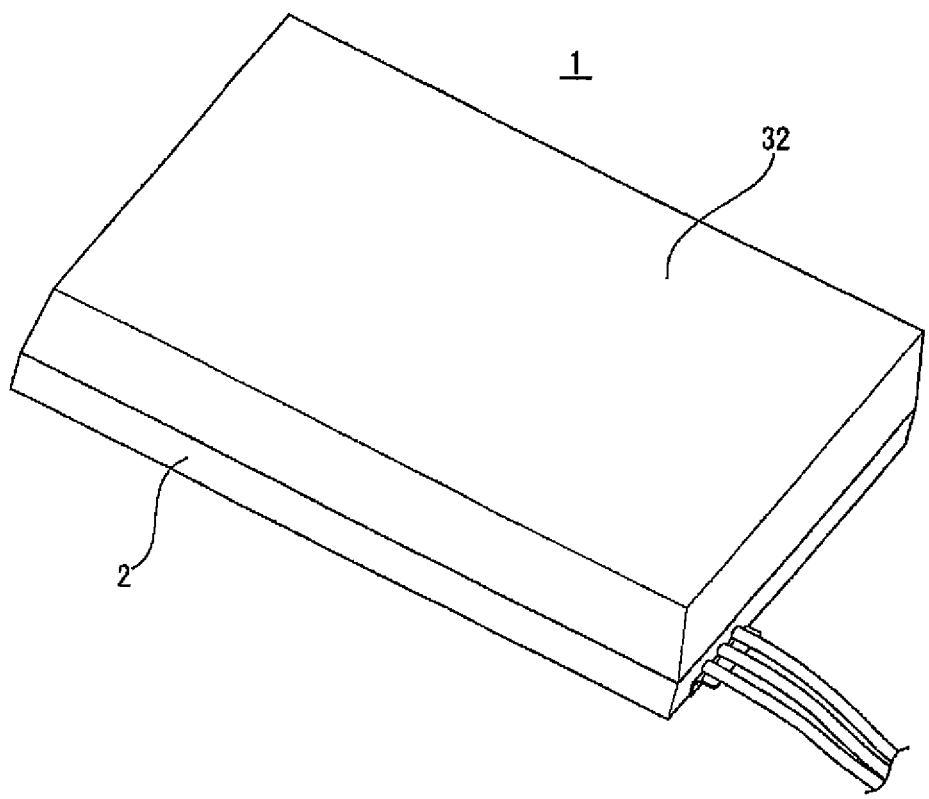
FIG. 3 is a perspective view showing a state where the lid is put on the battery module and the battery module is closed.

Lastly, the lid 32 is put over the shielding case 2, resulting in the state shown in FIG. 3.

The battery module is not limited to the foregoing embodiment. It is also possible to dispose a low-voltage electric wire on the upper surface side of the case cover 20, or to dispose a high-voltage electric wire under the case cover 20.

Furthermore, relays and electric components are mounted on a metal plate in this embodiment, but the relays and the electric components may be directly mounted on the bottom wall of the shielding case and fixed thereto without using the metal plate.

The invention claimed is:

1. A module for a battery for a vehicle comprising:
   a metal shielding case for housing a battery pack; and
   a junction box being housed inside the metal shielding case, the junction box having resin cases of a relay, an electric component, and a resin case cover,
   wherein:
   the resin cases of the relay and the electric component are fixed to a bottom wall of the shielding case or to a surface of a metal plate fixed to the bottom wall, and a first electric wire is laid out on the metal plate,
   the resin case cover of the junction box is put on in a state where the relay and the electric component fixed to the bottom wall or the metal plate as well as the first electric wire are covered with the case cover, upper surfaces of the relay and the electric component are exposed through openings provided in the case cover,
   the case cover is fixed to the shielding case by fastening and electrically connecting contact portions provided on the upper surfaces of a second electric wire and a bus bar disposed on the case cover, and
   contact portions of the relay and contact portions of the electric component, which are connected to the first electric wire, are provided on a side surface of the relay and a side surface of the electric component such that the first electric wire passes through a through hole provided on a side wall of the case cover.

* * * * *